United States Patent
Wostrel

(10) Patent No.: US 7,777,744 B2
(45) Date of Patent: Aug. 17, 2010

(54) SYSTEMS AND METHODS FOR MULTIPLE EQUATION GRAPHING

(75) Inventor: Todd M. Wostrel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 909 days.

(21) Appl. No.: 11/613,385

(22) Filed: Dec. 20, 2006

(65) Prior Publication Data

US 2007/0239808 A1    Oct. 11, 2007

Related U.S. Application Data

(60) Provisional application No. 60/790,142, filed on Apr. 7, 2006.

(51) Int. Cl.
    *G06T 11/20*    (2006.01)
    *G06F 17/00*    (2006.01)

(52) U.S. Cl. ..................... 345/440; 715/267

(58) Field of Classification Search ............. 715/267; 703/2; 708/204, 446; 345/440, 441, 173, 345/179; 382/187, 188, 189
See application file for complete search history.

(56) References Cited

U.S. PATENT DOCUMENTS

| | | | | |
|---|---|---|---|---|
| 5,189,633 A * | 2/1993 | Bonadio | ................ | 708/142 |
| 5,428,805 A * | 6/1995 | Morgan | ................ | 708/141 |
| 5,469,538 A * | 11/1995 | Razdow | ................ | 345/440 |
| 5,526,475 A * | 6/1996 | Razdow | ................ | 715/205 |
| 5,544,262 A * | 8/1996 | Pagallo | ................ | 382/189 |
| 5,559,939 A * | 9/1996 | Wada et al. | ................ | 715/267 |
| 5,627,914 A * | 5/1997 | Pagallo | ................ | 382/189 |
| 5,680,638 A * | 10/1997 | Satoh | ................ | 715/204 |
| 6,243,726 B1 * | 6/2001 | Satoh | ................ | 715/205 |
| 6,795,835 B2 * | 9/2004 | Ricart et al. | ................ | 1/1 |
| 6,795,838 B1 * | 9/2004 | Kataoka | ................ | 708/160 |
| 7,373,291 B2 * | 5/2008 | Garst | ................ | 704/4 |
| 7,447,360 B2 * | 11/2008 | Li et al. | ................ | 382/186 |
| 7,639,881 B2 * | 12/2009 | Viola et al. | ................ | 382/226 |
| 7,698,638 B2 * | 4/2010 | Sargent et al. | ................ | 715/267 |
| 2004/0114258 A1 * | 6/2004 | Harris et al. | ................ | 359/841 |
| 2004/0210828 A1 * | 10/2004 | Langer | ................ | 715/501.1 |
| 2004/0227738 A1 * | 11/2004 | Sudoh | ................ | 345/173 |

\* cited by examiner

*Primary Examiner*—Ryan R Yang
(74) *Attorney, Agent, or Firm*—Mirna Abyad; W. James Brady; Frederick J. Telecky, Jr.

(57) ABSTRACT

Various systems and methods for equation graphing are disclosed herein. For example, some embodiments of the present invention provide methods for graphing equations in a substantially real time environment. Such methods include receiving a first equation and a second equation, and parsing the equations such that they are each formatted in a common format. In addition, the first parsed equation is reduced to one or more first equation shapes that provide a graphical representation of the first equation. A determination is made abut whether a real time control has been satisfied. Where the real time control has been satisfied, the first equation shapes are painted to a display prior to reduction of the second parsed equation to one or more second equation shapes.

20 Claims, 4 Drawing Sheets

SYSTEMS AND METHODS FOR MULTIPLE EQUATION GRAPHING

CROSS REFERENCE TO RELATED APPLICATIONS

The present application claims priority to (is a non-provisional filing of) U.S. Provisional Patent Application No. 60/790,142, entitled "EFFICIENTLY RECEIVING AND GRAPHING MULTIPLE EQUATIONS" and filed Apr. 7, 2006 by Wostrel. The aforementioned application is assigned to an entity common hereto and is incorporated herein by reference for all purposes.

BACKGROUND OF THE INVENTION

The present invention is related to calculation devices, and more particularly, to improved systems and methods for graphing equations.

In a typical educational environment an instructor stands in front of a class of students and explains various concepts to them. As students have questions they call for the instructor's attention and ask their questions. This provides for a reasonable level of interaction and a reasonable learning experience. However, for some topics such as mathematics, a question may often involve discussion of an equation that is not easily described or understood without the use of graphical tools. Thus, the interaction may be limited as the instructor struggles to understand a student's question, and the student in turn struggles to understand any response provided by the instructor.

Thus, for at least the aforementioned reasons, there exists a need in the art for advanced systems and methods for providing mathematical instruction.

BRIEF SUMMARY OF THE INVENTION

The present invention is related to calculation devices, and more particularly, to improved systems and methods for graphing equations.

Various systems and methods for equation graphing are discussed in this document. For example, some embodiments of the present invention provide methods for graphing equations in a substantially real time environment. Such methods include receiving a first equation and a second equation, and parsing the equations such that they are each formatted in a common format. In addition, the first parsed equation is reduced to one or more first equation shapes that provide a graphical representation of the first equation. A determination is made abut whether a real time control has been satisfied. Where the real time control has been satisfied, the first equation shapes are painted to a display prior to reduction of the second parsed equation to one or more second equation shapes. In some instances, the real time control a timer that expires in, for example, two hundred milliseconds. In other instances, the real time control includes a timer that expires at a predetermined period coupled with a comparison of a number of equations remaining for processing with a predetermined equation number. In one particular case, the predetermined number of equations is five.

In various instances of the aforementioned embodiments, the one or more first equation shapes includes both first low resolution equation shapes and first high resolution equation shapes. Such low resolution shapes require reduced computation compared with the high resolution shapes, and such high resolution shapes are more detailed than the low resolution shapes. In some particular instances, the method further includes receiving a request to adjust a window of the display, and in response, limiting the first equation shapes to the first low resolution equation shapes. In such cases, the first high resolution equation shapes are not immediately computed. In one or more instances of the aforementioned embodiments, the methods further include painting a background to the display. Such a background may include a component background, a coordinate space grid, and/or a user defined image background.

Some instances of the aforementioned embodiments include rendering the first equation shapes and the second equation shapes into a shape image. In such instances, the methods may further comprise applying Bordering to the first equation shapes and the second equation shapes such that the first equation shapes are painted behind the second equation shapes. Where a request is received to select the first equation, the first equation shapes may be rendered into the shape image a second time such that the first equation shapes are additionally painted in front of the second equation shapes. In one or more instances of the aforementioned embodiments, the first equation shapes are compared with the second equation shapes. Where the two equation shapes are identical, only one of the two equation shapes are painted into a shape image.

Other embodiments of the present invention provide computer readable media with instructions executable by a computer to receive a first equation and a second equation; parse the first equation to create a first parsed equation such that the first parsed equation is formatted to a common format; parse the second equation to create a second parsed equation such that the second parsed equation is formatted to the common format; reduce the first parsed equation to one or more first equation shapes such that the one or more first equation shapes provide a graphical representation of the first equation; determine that a real time control has been satisfied; and based at least in part on the satisfaction of the real time control, paint the first equation shapes to a display prior to reducing the second parsed equation to one or more second equation shapes.

Yet other embodiments of the present invention provide equation graphing systems. Such equation graphing systems include an equation transfer interface that is operable to receive a first equation and a second equation from one or more equation dispatch systems via a network. The equation graphing systems further include an equation processor and a computer readable medium accessible to the equation processor. As used herein, the phrase "computer readable medium" may be any storage media accessible to a computer. Thus, a computer readable medium may be, but is not limited to, a random access memory, a flash memory, a hard disk drive, a CD-ROM, a tape storage, a floppy diskette, any combination of the aforementioned, or the like. The computer readable medium includes instructions executable by the equation processor to: parse the first equation to create a first parsed equation, such that the first parsed equation is formatted to a common format; parse the second equation to create a second parsed equation, such that wherein the second parsed equation is formatted to the common format; reduce the first parsed equation to one or more first equation shapes, such that the one or more first equation shapes provide a graphical representation of the first equation; and determine that a real time control has been satisfied. The equation graphing systems further include a graphical user interface which, based at least in part on the satisfaction of the real time control, is operable to paint the first equation shapes to a display prior to reduction of the second parsed equation to one or more second equation shapes. In some cases, the equation dispatch systems are calculators, and the network is a wireless network.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to calculation devices, and more particularly, to improved systems and methods for graphing equations.

Figure 1:
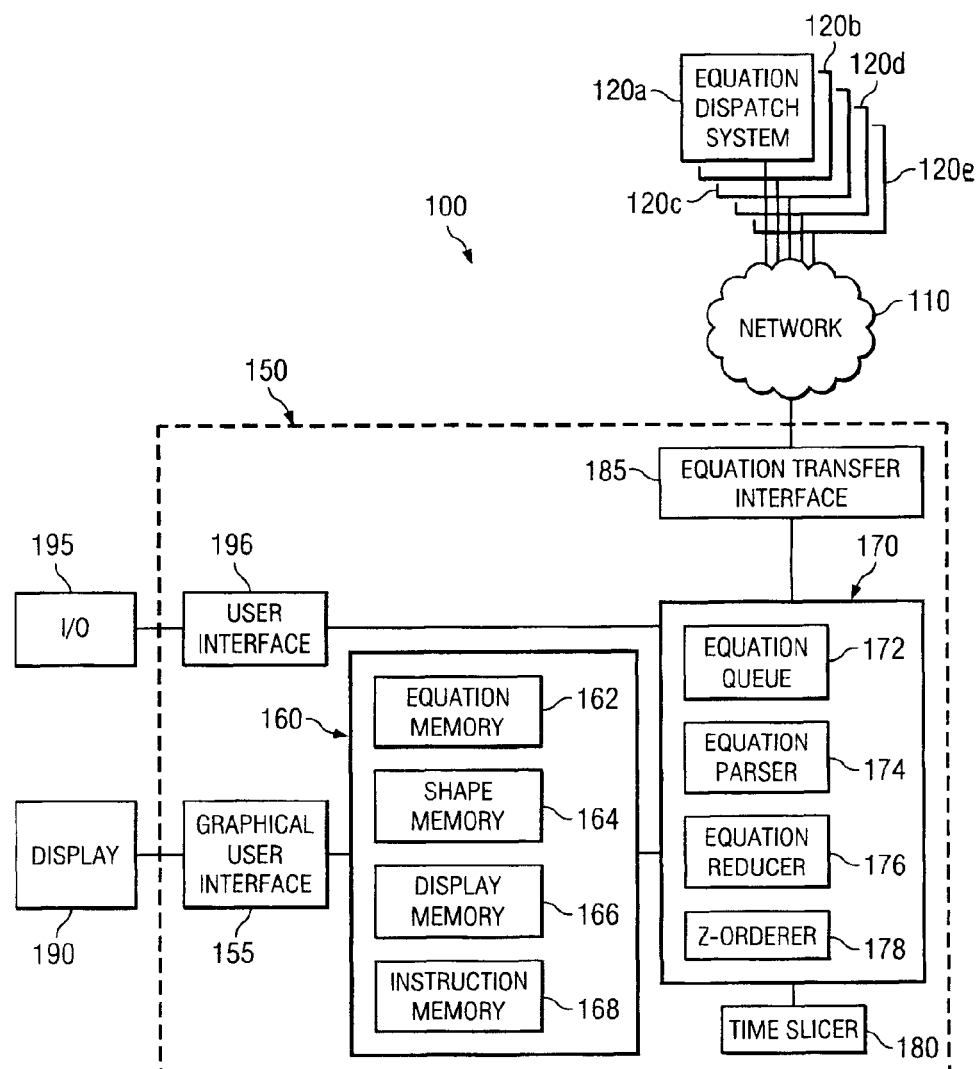
FIG. 1 depicts a system for graphing equations received from a variety of sources in accordance with one or more embodiments of the present invention.

Turning to FIG. 1, a system 100 for graphing equations received from a variety of sources is depicted in accordance with one or more embodiments of the present invention. System 100 includes a number of equation dispatch systems 120 that are capable of transferring one or more equations to an equation processing system 150 via a network 110. Equation processing system 150 is capable of displaying graphical representations of processed equations via a display 190. In some cases, equation dispatch systems 120 are hand-held calculators that include an ability to receive equation information from a user and to transfer the received equations to network 110. It should be noted, however, that equation dispatch systems 120 are not limited to hand-held calculators. Rather, equation dispatch systems 120 may be any electronic device capable of receiving equation information from a user and transferring the received equation to a network. Thus, for example, equation dispatch systems may be, but are not limited to, personal digital assistants, personal computers, laptop computers or the like. Network 110 may be any network capable of receiving electronic information from equation dispatch systems 120 and transferring the electronic information to equation processing system 150. Thus, network 110 may be, but is not limited to, wired local area network, a wireless local area network, a virtual private network, an infrared network, the Internet, a wide area network, and/or combinations of the aforementioned. In some cases, display 190 is a projector with an associated screen. It should be noted, however, that display 190 may be any type of display that is capable of displaying a graphical representation of one or more equations. Thus, display 190 may be, but is not limited to, a CRT display, a flat screen display, a television, or the like.

Equation processing system 150 includes a number of modules. In some cases, equation processing system 150 is implemented using a microprocessor executing various software modules that are accessible from either onboard or external memory, and accessing onboard graphics capabilities. In other cases, equation processing system 150 is implemented using a microprocessor executing various software modules that are accessible from either onboard or external memory, and accessing external storage and an external stand alone graphical user interface. Based on the disclosure provided herein, one of ordinary skill in the art will recognize a variety of implementations that may be used to implement the functions of equation processing system 150 as discussed below.

Equation processing system 150 includes and equation transfer interface 185 implemented as a circuit, software, or some combination thereof. Equation processing system 150 is at least capable of receiving equation information via network 110 from equation dispatch systems 120. Equation transfer interface 185 is further capable of providing received equations for processing by other modules of equation processing system 150.

Equation processing system 150 further includes an equation processor 170 that includes a number of modules designed for processing equations received from equation transfer interface 185, a time slicer 180 that is used to enforce a real time feel for the display of processed equations (i.e., is used to enforce a timely update for the display), a memory 160 that includes a number of memories used in the processing and graphical display of equations, and a graphical user interface 155. Equation processor 170 includes an equation queue 172 that is operable to maintain an ordered queue of unprocessed equations. In one particular case, equation queue 172 is a first in, first out memory. In other cases, equation queue is a series of pointers that identify the location of equations within memory 160. Based on the disclosure provided herein, one of ordinary skill in the art will recognize a number of circuit and/or software structures that may be used to implement equation queue 172.

Equation processor 170 further includes an equation parser 174. Equation parser 174 is operable to receive an equation from equation queue 172, and to reduce the received equation to a common equation format that is readily processed by equation processor 170. Thus, for example, where the following two equations are received: $y=4*(3x+2)-6*2x+3x^2$, and $y=3x^2+2*(6x-6x+4)$; both are reduced to $y=3x^2+8$. In this way, equation parser 174 renders all received equations readily comparable. It should be noted that any number of equations including zero, one, or more variables are possible in accordance with embodiments of the present invention. Based on the disclosure provided herein, one of ordinary skill in the art will recognize a number of different equations that may be processed in accordance with various embodiments of the present invention. Further, equation parser may be operable to eliminate identical or substantially similar equations to reduce processing time. Thus, for example, one of the two preceding equations may be eliminated as they are mathematically identical. However, the two equations may have been received with distinct graphing characteristics. For example, one of the equations may call for graphing using a wider line width than the other. In such a case, one of the equations may be eliminated because they are substantially similar. Alternatively, they may both be retained as they are different from a graphical perspective. The parsed equations are maintained in an equation memory 162 that is part of memory 160.

Equation processor 170 further includes an equation reducer 176. Equation reducer 176 is operable to reduce the received equations to a number of equation shapes that when assembled together represent the equation. Further, equation reducer 176 is operable to eliminate duplication of equation shapes across the number of equations maintained in equation memory 162. The equation shapes are a function of some subset of a two dimensional location (representing a two dimensional location on a flat display, but possibly representing an equation with more or fewer than two dimensions), a color and a width. The produced equation shapes are stored to a shape memory 164 that is part of memory 160. In some embodiments of the present invention, reduction of a given equation is done only one time with the resulting equation shapes being maintained in a memory for later use and reuse in painting a display on which the equations are shown.

Equation processor 170 further includes a Z-orderer that is operable to provide Z-ordering of the equation shapes maintained in shape memory 164. Thus, for example, all of the equation shapes associated with one equation may be defined to be in the back of all of the equation shapes associated with another equation. Thus, the z-order of the back equation is less than the z-order of the front equation. The z-ordered equation shapes are written to a display memory 166 that is part of memory 160.

Time slicer 180 is operable to provide an interrupt to the processing of equation processor 170 to guarantee a real time feel to the display of graphical representations of the equations to display 190. Graphical user interface 155 accesses display memory 166 which includes a graphical representation of multiple equations to be displayed, and formats the information in display memory 166 for display 190. Equation processing system 150 further includes a set of input and output devices 195. Such input and output devices may include, but are not limited to, a mouse, a keyboard, a speaker, a microphone, or the like. The input output devices are communicably coupled to equation processor 170 via a user interface 196 that may be any user interface known in the art that is capable of receiving input from input/output devices 190 and providing an indication of such devices to equation processor 170. Input/Output devices 195 may be used, for example, by a user of equation processing system to select a window for display via display 190, adding an equation for viewing, selecting one of many equations to be displayed atop other equations, deleting an equation from the display, or the like. Based on the disclosure provided herein, one of ordinary skill in the art will recognize a variety of user commands that may be entered and processed using input/output devices 195 and user interface 196. In addition, memory 160 may include an instruction memory 168 that includes software instructions executable by equation processor 170. Such memory may be integrated on a chip, or included as an off chip memory, or may be some combination of both.

Turning to FIG. 2, a method in accordance with various embodiments of the present invention for graphing multiple incoming equations is shown as a flow diagram 200. Following flow diagram 200, an equation graphing system is initialized (block 202). Initialization includes a number of steps occurring between points designated A and B on FIG. 2a. FIG. 2b provides an expanded view of the functionality occurring between points A and B (block 202). In particular, block 202 includes indicating that the background image is invalid (block 210). In some cases, the equation graphing system displays a number of equations over a user selectable background image. In some cases, the background image is a set of axis to which the graphical depictions of the equations are referenced. However, it is plausible that any background may be used in accordance with embodiments of the present invention.

In addition, the equation image is indicated as invalid (block 203). The equation image consists of the combination of equation shapes that are ultimately painted to the display. Further, the equation resolution is set to high (block 205). Setting the equation resolution to high will cause the equations to be displayed in a high resolution mode absent some later identified limitation on processing time. The equation queue is also cleared (block 207). This may include removing all equations from the queue or simply resetting a pointer into the queue depending upon how the equation queue is designed. Similarly, the shape memory is cleared (blocks 209, 211). This includes clearing both the high resolution shape buffer and the low resolution shape buffer.

Once the equation graphing system has been initialized (block 202), a command is awaited. The commands that are possible include a request to adjust the window in which the graphical representation of the equations is displayed (block 204), a request to update a previously submitted equation (block 208), a request to delete a previously submitted equation (block 212), or a request to add a new equation (block 216). Where a request to adjust the display window is received (block 204), the equation resolution is set to low (block 206) and the image to be displayed is updated (block 300). Such a window adjustment may be received via a user control interface associated with the equation graphing system, and may include, but is not limited to, a request to pan the image in a particular direction, a request to zoom in or out on the image, or some combination of the aforementioned operations. Reducing the image resolution while the display window is being adjusted reduces the amount of processing time spent providing high resolution graphical representations of the equations as is more fully discussed below. This is helpful as it is very important to provide rapid display updates when the display window is being adjusted, and a low resolution graphical representation of an equation during a window adjustment is not necessarily noticeable to a user. In some cases, the aforementioned requests to add, update or delete equations are grouped into repaint requests which may occur at the end of a given time slice. In one particular embodiment of the present invention, as more fully discussed below, the time slice is approximately two hundred milliseconds.

An update equation request is received with a new equation and an indication of a previously submitted equation that is to be replaced by the new equation. An update equation request may be received from an equation dispatch system via an equation transfer interface associated with the equation graphing system, or from a user interface associated with the equation graphing system. Where an update equation request is received (block 208), the new equation is added to the equation queue (block 210), and the equation that it is to replace is deleted from one or more of the equation queue, a set of parsed equations, or the equation shapes depending upon how far the processing had proceeded on the equation that is being replaced (block 214). In some cases where the deleted equation is still in the equation queue, the new equation is placed in the equation queue at the location of the deleted equation. Alternatively, in other cases, the newly received equation is placed in the equation queue at the next available location. Based on the disclosure provided herein, one of ordinary skill in the art will recognize various approaches that may be used in accordance with embodiments of the present invention for replacing one equation with an updated equation.

Once the equation is updated to the equation queue (block 210) and the replaced equation is removed (block 214), the equation image is indicated as invalid (block 220). This will cause the equation image to be updated with the new equation. The new equation along with any other previously received and unprocessed equations is prepared for display (block 222). This process indicated as occurring between points C and D is discussed in much greater detail below. Once the image is prepared (block 222), it is updated to the image display (block 300).

A delete equation request is received as an indication of an equation to be deleted. A delete equation request may be received from an equation dispatch system via an equation transfer interface associated with the equation graphing system, or from a user interface associated with the equation graphing system. Where a delete equation request is received (block 212), the equation to be deleted removed from one or more of the equation queue, a set of parsed equations, or the equation shapes depending upon how far the processing had proceeded on the equation that is being replaced (block 214). Based on the disclosure provided herein, one of ordinary skill in the art will recognize various approaches that may be used in accordance with embodiments of the present invention for eliminating an identified equation.

Once the identified equation is deleted (block 214), the equation image is indicated as invalid (block 220). This will cause the equation image to be updated with the new equation. The new equation along with any other previously received and unprocessed equations is prepared for display (block 222). This process indicated as occurring between points C and D is discussed in much greater detail below. Once the image is prepared (block 222), it is updated to the image display (block 300).

An add equation request is received along with an equation to be added to the graphical display. An add equation request may be received from an equation dispatch system via an equation transfer interface associated with the equation graphing system, or from a user interface associated with the equation graphing system. Where an add equation request is received (block 216), the received equation is added to the equation queue (block 218). Once the received equation is added to the equation queue (block 218), the equation image is indicated as invalid (block 220). This will cause the equation image to be updated with the new equation. The new equation along with any other previously received and unprocessed equations is prepared for display (block 222). This process indicated as occurring between points C and D is discussed in much greater detail below. Once the image is prepared (block 222), it is updated to the image display (block 300).

Figure 2A:
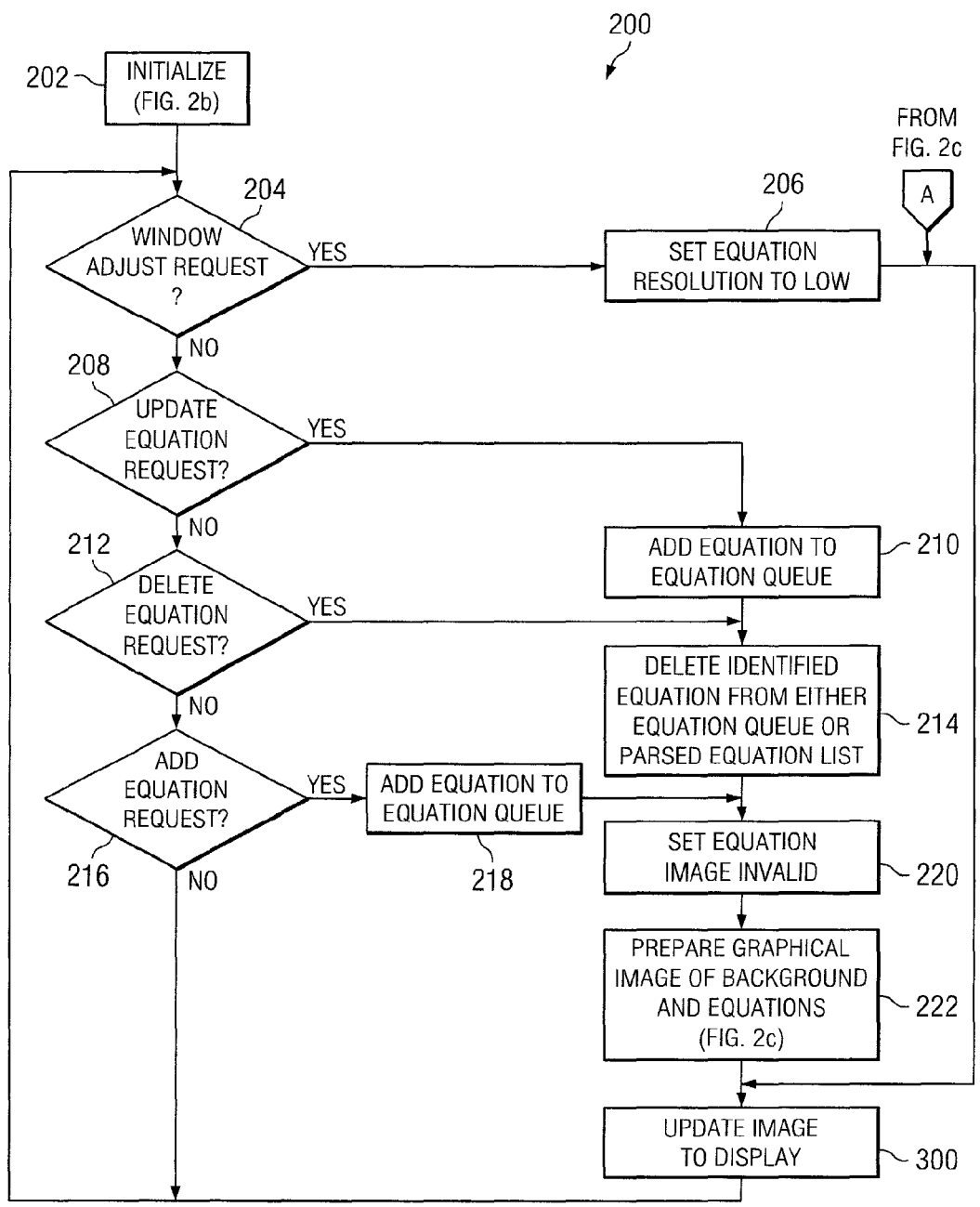
FIGS. 2a-2d depicts a method in accordance with various embodiments of the present invention for graphing multiple incoming equations.
Figure 2B:
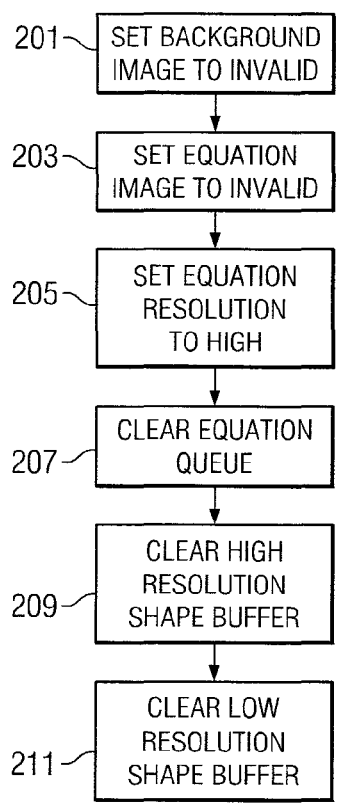
Figure 2D:
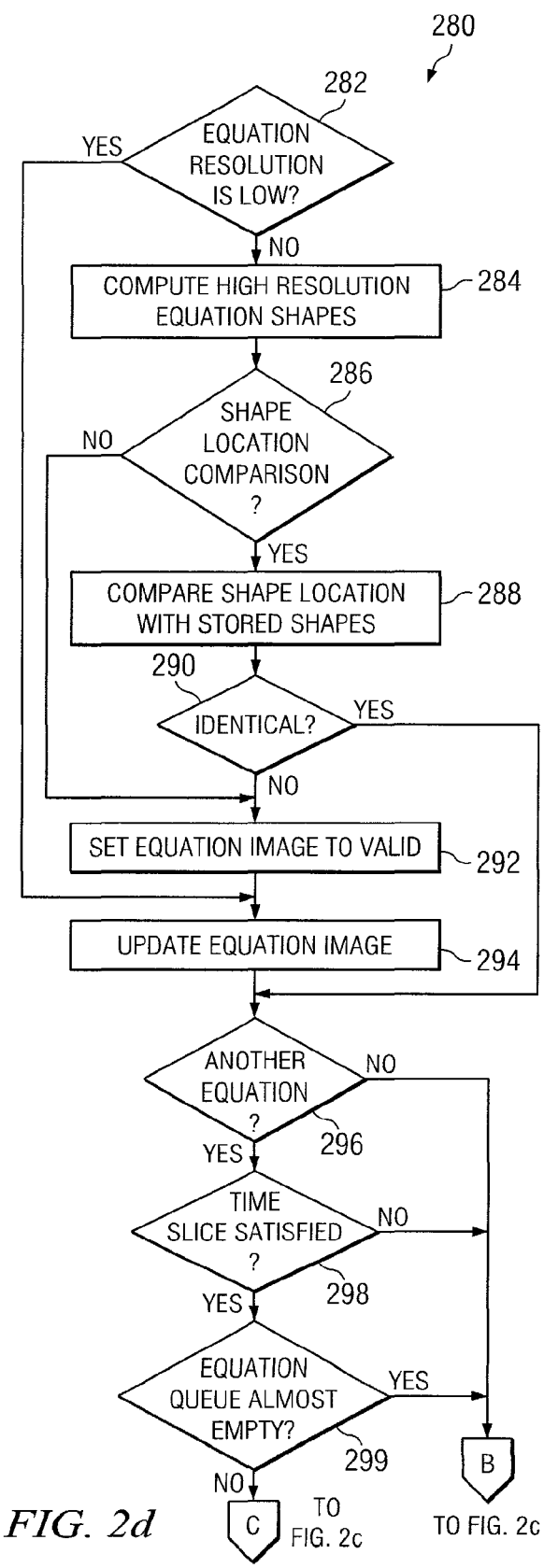
Figure 2C:
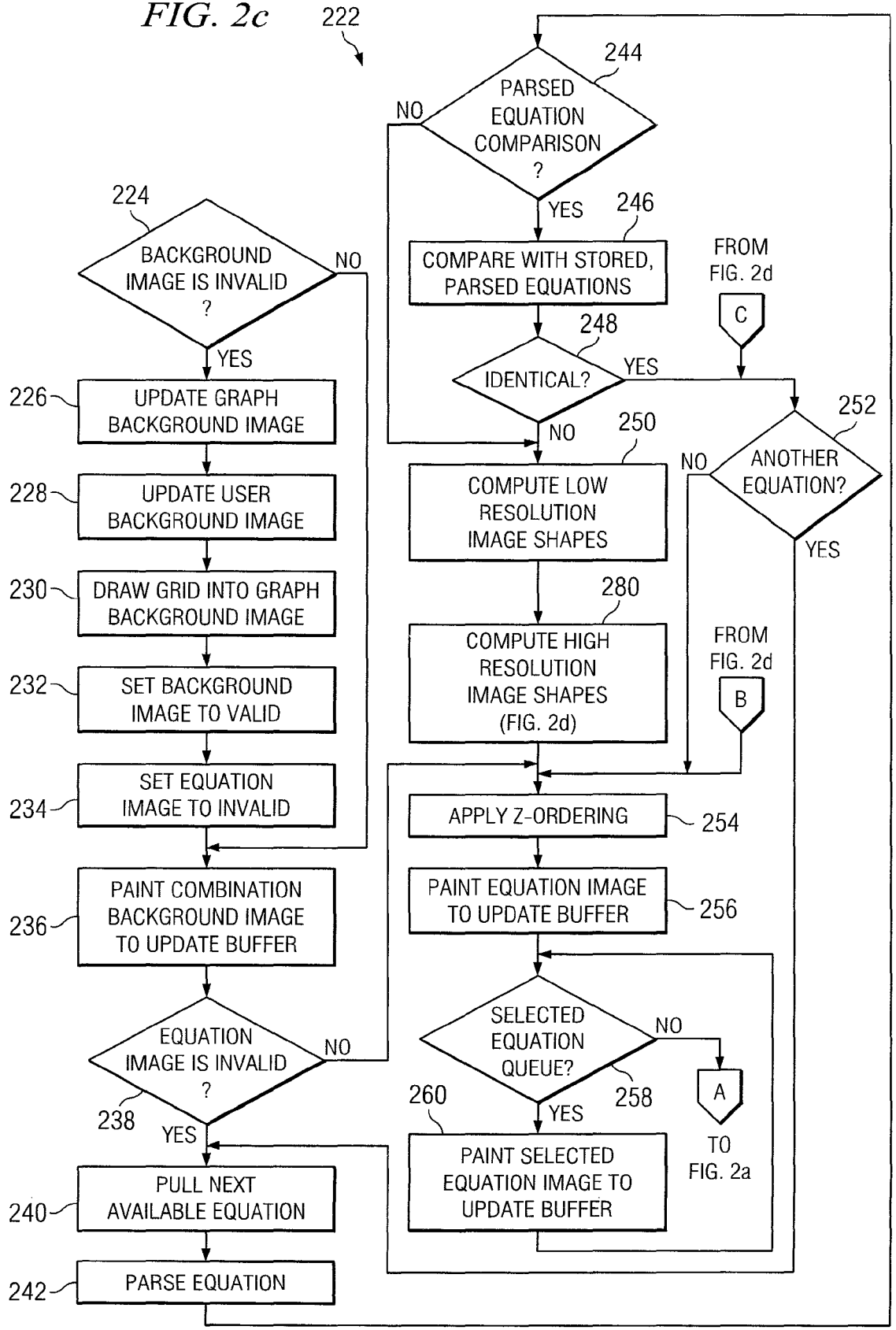

The process of preparing the image for display (block 222) is shown in FIG. 2c. Following the flow diagram of FIG. 2c, it is determined if the background image is invalid (block 224). Where the background image is not invalid (block 224), the existing background image is painted to the image buffer (block 236). Alternatively, where the background image is invalid (block 224), a graph background and a user background are updated (blocks 226, 228). The graph background and user background together may form a desired background over which graphical representations of equations are painted. In general, the background includes a combination of a component background, a coordinate space grid, a user defined background image, and possibly other non-equation data that is set in the background of the equation graph. The background may need to be repainted when, for example, the image is zoomed or panned, or when the background is changed. The coordinate grid to which the received equations will be referenced is drawn over the graph background (block 230). Thus, for example, the grid may include an x-axis and y-axis with reference units indicated as cross-hatches on the respective axis. Based on the disclosure provided herein, one of ordinary skill in the art will recognize a variety of graph backgrounds, user backgrounds and grids that may be selected and over which graphical representations of equations may be displayed. For example, a graph background may include a three dimensional grid with an x-axis, a y-axis and a z-axis.

Once the user background and the graph background with corresponding grid are prepared (blocks 226, 228, 230), the background image is set to valid (block 232). Setting the image background to valid indicates that the background image is up to date and ready for display. In addition, the equation image is set to invalid (block 234) indicating that the equation image needs to be redrawn because the background has been replaced. The combination of the background image portions are then painted to an image update buffer (block 236). Ultimately, a graphical user interface accesses the update buffer and uses the received information to format a display image.

It is next determined whether the equation image is invalid (block 238). The equation image is indicated as invalid anytime the equation image has been modified through the addition of new equations and/or the deletion of old equations. Where the equation image is not invalid (block 238), z-ordering is applied to the previously prepared equation shapes (block 254), and the equation image is updated to the update buffer (block 256). As is known in the art, z-ordering the equations involves placing equations in the foreground and background relative to one another such that the equation in the extreme foreground overlays all other equations at the intersection points, and the equation in the extreme background is overlayed by all other equations. It is then determined whether one of the equations has been selected for discussion (block 258). Where an equation is selected for discussion (block 258), it is re-written to the update buffer such that its z-order places it in the extreme foreground (block 260). In this way, the selected equation may be written twice—once in its original z-order as established in block 256, and a second time in the extreme foreground from block 260. In some cases more than one equation is selected (block 258). In such cases, the most recently selected equation is written with in the most extreme foreground, with the other selected equations written at successive z-order positions underneath the extreme foreground.

Alternatively, where the equation image is invalid (block 238), the equation image is updated before it is provided anew to the display. In particular, if a new equation is available in the equation queue it is pulled out for processing (block 240). From there, the next available equation is parsed (block 242). Such parsing reduces the equation to a common equation format that is readily processed. Thus, for example, where the following equation is received: $z=ax+2bx+x+3$, it is reduced to $z=x^2+(a+2b)x+3$. This renders equations comparable to other equations that may in some cases be mathematically identical, but organized differently. For example, where the following equation is also received: $z-2bx=x^2+ax+3$, it also reduces to $z=x^2+(a+2b)x+3$. Thus, while at first glance the equations may be considered different, after parsing they may be identified as mathematically identical.

After parsing is completed (block 242), it is determined whether the parsed equations are to be compared (block 244). Where the parsed equations are to be compared (block 244), the most recently parsed equation is compared with other equations that were previously parsed (block 246). Where the parsed equation does not match any of the previously parsed equations (block 248), low resolution image shapes are computed for the equation and stored in a low resolution image shape memory (block 250). Computing low resolution images includes plugging a number of values (e.g., a number of different values for x in the aforementioned equation) into the equations to be graphed and identifying the proper Cartesian coordinate for the display at which the value would be represented. This is done for only a relatively few number of values so that the general shape of the equation can be represented, but without expending undue processing time.

In some cases, the number of values plugged into an equation is adaptively determined based the given equation. This is done to assure that regions of interest in the equation may be adequately graphed using the low resolution computation. For example, the equation $y=x^3/10$ changes rapidly around the location x=0. Thus, a higher resolution may be applied around the x=0 point, with the resolution reducing as the value of x moves farther away from zero. As an example, for the equation $y=x^3/10$, low resolution computations may be performed for the following increments: x=−3, −2, −1.5, −1, −0.6, −0.3, −0.15, −0.07, 0, 0.07, 0.15, 0.3, 0.6, 1, 2, 3. This allows the graphical image of the equation to show important curvature aspects of the equation even though the graph is being produced in the low resolution mode. Alternatively, where a universal resolution increment is applied to all equations and across the entire range for the equations (e.g., computations are done for x=−3, −2.5 −2, −1.5 −1, −0.5, 0, 0.5, 1, 1.5, 2, 2.5, 3 . . . ) without considering the effects on a particular equation, the curvature around key points of the equation are lost. However, at non-key points of the equation no detail may be lost where relatively large computation increments are used.

Next, where desired, high resolution shapes for the equation are computed (block 280). It should be noted that embodiments of the present invention provide for computing equation shapes one time, and thereafter retaining the equation shapes in memory until the equation is deleted or otherwise withdrawn from consideration. By rendering the equation shape only once, rather than each time the equation is graphed, significant processing time is saved. Also, as shown, the equations are computed in a high and low resolution. When updates are happening quickly (e.g., when zooming or panning on a graph image), the equation graphing system can go into an adjustment mode where only low resolution images are computed to make the updates appear substantially in real time to a user. As the CPU is freed, the high resolution shapes are computed asynchronously to the user thread and painted to the display memory as they become available. The complexity of block 280 is more fully described below in relation to FIG. 2d. Depending upon the outcome of block 280, the image is either updated (blocks 254-260), or it is determined whether another equation remains to be processed (block 252).

Alternatively, where the recently parsed equation matches one of the previously parsed equations (block 248), the newly parsed equation is not processed any further as it is not needed. In this case, it is determined whether another equation is in the equation queue for processing (block 252). Where another equation is available for processing (block 252), it is pulled from the equation queue (block 240) and processed as previously described (blocks 242, 244, 246, 248, 250, 280). Alternatively, where no additional equations remain for processing (block 252), z-ordering is applied to the previously prepared equation shapes (block 254), and the equation image is updated to the update buffer (block 256). It is then determined whether one of the equations has been selected for discussion (block 258). Where an equation is selected for discussion (block 258), it is re-written to the update buffer such that its z-order places it in the extreme foreground (block 260). In this way, the selected equation may be written twice—once in its original z-order as established in block 256, and a second time in the extreme foreground from block 260. In some cases more than one equation is selected (block 258). In such cases, the most recently selected equation is written with in the most extreme foreground, with the other selected equations written at successive z-order positions underneath the extreme foreground.

Turning to FIG. 2d, the process of computing high resolution image shapes is discussed (block 280). The process begins at point E, and ends at either points F or point G. First, it is determined if the selected equation resolution is low (block 282). Equation resolution may be selected as low if, for example, a window adjustment is ongoing as was discussed above in relation to blocks 204-206. Where the equation resolution is not set to low (block 282), high resolution equation shapes are computed for the equation and stored in a high resolution image shape memory (block 284). Computing high resolution images includes plugging a number of values (e.g., a number of different values for x in the exemplary equations above) into the equations to be graphed and identifying the proper Cartesian coordinate for the display at which the value would be represented. This is done for a large number of values which requires a substantial amount of processing time, but also results in a very high resolution graphical representation of the equation.

In some cases, any line width and/or line color information may be incorporated in the image shapes. Thus, by the time the process is done, a combination of all of the computed image shapes provides a high resolution graph of the equation in the desired line width and color. In other cases, however, line width and color information may be maintained apart from the shape information. This allows for multiple equations to use the same shape objects. Thus, for example, where one student enters the equation y=x+1 with a line width one and a color green, and another student enters the same equation with a line width two and a color purple only one common set of shapes need be produced for the two submissions. When the submissions are ultimately painted, the shapes from the common set of shapes are extracted for the first equation and the color and line width associated therewith are applied to that equation. Subsequently, the color and line width associated with the second equation are painted. Maintaining the shapes and attributes separate also allows the process of selecting one of many equations (described more fully in relation to blocks 258-260) below to operate more efficiently as it limits the need to force a redraw of underlying equation shapes.

It is next determined whether a shape location comparison is to be done (block 286). Where a shape location comparison is to be done (block 286), the equation shapes computed to graphically represent the equation at issue are compared with previously computed equation shapes (block 288). Where an identical match is found between two equation shapes (i.e., a match in both Cartesian coordinates and line width), the equation shape is not included in the graph as it is purely duplicative (block 290). Otherwise, equation shapes that are not identical are stored to an equation image buffer (block 294) and the equation image is set to valid (block 292).

It is then determined whether another equation is in the equation queue (block 296). Where no other equation remains (block 296), the process is returned for Bordering and image painting (previously discussed in relation to FIG. 2c). Otherwise, where another equation remains to be processed (block 296), it is determined whether high resolution shapes for the next equation(s) can be computed without disturbing the real time feel of the equation graphing process (block 298 and block 299). In particular, it is determined whether a time slice has been satisfied (block 298). In some cases, the time slice is a two hundred millisecond timer that is started each time equation processing begins (block 222). The timer seeks to limit the amount of time spent in equation processing without a pause to update an output display. Without consistent updating of the output display, a user would be prone to thinking that the equation graphing system has entered an infinite loop or has otherwise failed. This renders the system ineffective for its purpose of providing an equation graphing experience that provides graphical updates substantially in real time.

Where the time slice has been satisfied (i.e., a timer has reached a predetermined maximum) (block 298), it is determined whether only a limited number of equations remain to be processed (block 299). Where only very few equations remain to be processed (block 299), the processing continues even though the time slice has been satisfied. This is because a limit extension of the equation processing time will still retain the appearance of real time processing. In one particular case, where the number of equations remaining for processing is less than five, the processing continues. Based on the disclosure provided herein, one of ordinary skill in the art will recognize a variety of timer values and/or numbers of remaining equations to be used to assure that processing continues with a substantially real time feel. Where the equation queue is almost empty (block 299) or the time slice has not expired (block 299), then the next available equation is accessed and processed (previously discussed in relation to FIG. 2c). Otherwise, equation processing is stopped and the process is returned for z-ordering and image painting (previously discussed in relation to FIG. 2c).

As will be appreciated by one of ordinary skill in the art, one or more embodiments of the present invention may be used to implement high performance interactive equation graphing systems. Such systems may allow equations from multiple sources to be submitted asynchronously with an individual z-order and graphical attributes (e.g., pen width and color) associated with each of the respective equations. Further, the received equations may be continuous or discontinuous on either x or y independent variables.

In conclusion, the present invention provides novel systems, devices, methods and arrangements for graphing equations. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for graphing equations in a substantially real time environment, the method comprising:
   receiving a first equation and a second equation;
   parsing the first equation to create a first parsed equation, wherein the first parsed equation is formatted to a common format;
   parsing the second equation to create a second parsed equation, wherein the second parsed equation is formatted to the common format;
   reducing the first parsed equation to one or more first equation shapes, wherein the one or more first equation shapes provide a graphical representation of the first equation;
   determining that a real time control has been satisfied; and
   based at least in part on the satisfaction of the real time control, painting the first equation shapes to a display prior to reducing the second parsed equation to one or more second equation shapes, wherein the one or more second equation shapes provide a graphical representation of the second equation.

2. The method of claim 1, wherein the real time control includes expiration of a time period.

3. The method of claim 2, wherein the time period is two hundred milliseconds.

4. The method of claim 1, wherein the real time control includes expiration of a time period coupled with a number of equations remaining for processing exceeding a predetermined limit.

5. The method of claim 4, wherein the predetermined limit is five equations remaining for processing.

6. The method of claim 1, wherein the one or more first equation shapes includes both a first low resolution equation shapes and first high resolution equation shapes, wherein the low resolution shapes require reduced computation compared with the high resolution shapes, and wherein the high resolution shapes are more detailed than the low resolution shapes.

7. The method of claim 6, wherein the method further includes:
   receiving a request to adjust a window of the display; and
   limiting the first equation shapes to the first low resolution equation shapes, wherein the first high resolution equation shapes are not immediately computed.

8. The method of claim 1, wherein the method further comprises:
   painting a background to the display.

9. The method of claim 8, wherein the background includes one or more elements selected from a group consisting of:
   a component background, a coordinate space grid, and a user defined image background.

10. The method of claim 1, wherein the method further comprises:
    rendering the first equation shapes and the second equation shapes into a shape image.

11. The method of claim 10, wherein the method further comprises:
    applying Bordering to the first equation shapes and the second equation shapes, wherein the first equation shapes are painted behind the second equation shapes.

12. The method of claim 11, wherein the method further comprises:
    receiving a request to select the first equation; and
    based on the request to select the first equation, rendering the first equation shapes into the shape image a second time, wherein the first equation shapes are additionally painted in front of the second equation shapes.

13. The method of claim 1, wherein the method further comprises:
    comparing the first equation shapes and the second equation shapes;
    wherein it is determined that the first equation shapes and the second equation shapes are identical; and
    wherein only one of the first equation shapes and the second equation shapes are painted into a shape image.

14. A computer readable medium, wherein the computer readable medium includes instructions executable by a computer to:
    receive a first equation and a second equation;
    parse the first equation to create a first parsed equation, wherein the first parsed equation is formatted to a common format;

parse the second equation to create a second parsed equation, wherein the second parsed equation is formatted to the common format;
reduce the first parsed equation to one or more first equation shapes, wherein the one or more first equation shapes provide a graphical representation of the first equation;
determine that a real time control has been satisfied; and
based at least in part on the satisfaction of the real time control, paint the first equation shapes to a display prior to reducing the second parsed equation to one or more second equation shapes, wherein the one or more second equation shapes provide a graphical representation of the second equation.

15. The computer readable medium of claim 14, wherein the one or more first equation shapes includes equation shapes selected from a group consisting of: a first low resolution equation shapes and first high resolution equation shapes; and wherein the instructions are further executable by the computer to: receive a request to adjust a window of the display; and to limit the first equation shapes to the first low resolution equation shapes, wherein the first high resolution equation shapes are not immediately computed.

16. The computer readable medium of claim 14, wherein the instructions are further executable by a computer to:
render the first equation shapes and the second equation shapes into a shape image;
apply z-ordering to the first equation shapes and the second equation shapes, wherein the first equation shapes are painted behind the second equation shapes;
receive a request to select the first equation; and
based on the request to select the first equation, render the first equation shapes into the shape image a second time, wherein the first equation shapes are additionally painted in front of the second equation shapes.

17. The computer readable medium of claim 14, wherein the real time control includes expiration of a time period coupled with a number of equations remaining for processing exceeding a predetermined limit.

18. An equation graphing system, the equation graphing system comprising:
an equation transfer interface, wherein the equation transfer interface is operable to receive a first equation and a second equation from one or more equation dispatch systems via a network;
an equation processor;
a computer readable medium accessible to the equation processor, wherein the computer readable medium includes instructions executable by the equation processor to:
parse the first equation to create a first parsed equation, wherein the first parsed equation is formatted to a common format;
parse the second equation to create a second parsed equation, wherein the second parsed equation is formatted to the common format;
reduce the first parsed equation to one or more first equation shapes, wherein the one or more first equation shapes provide a graphical representation of the first equation; and
determine that a real time control has been satisfied;
a graphical user interface, wherein, based at least in part on the satisfaction of the real time control, the graphical user interface is operable to paint the first equation shapes to a display prior to reduction of the second parsed equation to one or more second equation shapes, wherein the one or more second equation shapes provide a graphical representation of the second equation.

19. The system of claim 18, wherein the equation dispatch systems are calculators.

20. The system of claim 18, wherein the network is a wireless network.

* * * * *